US009223326B2

(12) United States Patent
Allen-Ware et al.

(10) Patent No.: US 9,223,326 B2
(45) Date of Patent: Dec. 29, 2015

(54) DISTRIBUTED THERMAL MANAGEMENT SYSTEM FOR SERVERS

(75) Inventors: Malcolm Scott Allen-Ware, Austin, TX (US); Timothy Glen Hallett, Oronoco, MN (US); Wei Huang, Austin, TX (US); Charles Robert Lefurgy, Austin, TX (US); Glenn Rueban Miles, Austin, TX (US); Guillermo Jesus Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 13/555,183

(22) Filed: Jul. 22, 2012

(65) Prior Publication Data

US 2014/0025208 A1    Jan. 23, 2014

(51) Int. Cl.
G05D 23/00 (2006.01)
G05D 23/19 (2006.01)
G06F 11/20 (2006.01)

(52) U.S. Cl.
CPC ........ *G05D 23/1934* (2013.01); *G06F 11/2023* (2013.01)

(58) Field of Classification Search
None
See application file for complete search history.

(56) References Cited

U.S. PATENT DOCUMENTS

| | | | |
|---|---|---|---|
| 6,318,965 B1 * | 11/2001 | Nair ................................... 417/2 |
| 6,368,064 B1 * | 4/2002 | Bendikas et al. ................. 417/2 |
| 6,535,798 B1 | 3/2003 | Bhatia et al. .................. 700/293 |
| 6,814,546 B2 * | 11/2004 | Sekiguchi ......................... 417/3 |
| 6,932,696 B2 * | 8/2005 | Schwartz et al. ............. 454/184 |
| 6,950,969 B2 * | 9/2005 | Thompson et al. ............. 714/44 |
| 7,294,980 B2 * | 11/2007 | Ma et al. ......................... 318/49 |
| 7,310,737 B2 | 12/2007 | Patel et al. .................... 713/300 |
| 7,800,246 B2 | 9/2010 | Lv et al. .......................... 307/29 |
| 2004/0130868 A1 * | 7/2004 | Schwartz et al. ............. 361/687 |
| 2005/0046362 A1 * | 3/2005 | Ma et al. ......................... 318/77 |
| 2005/0257213 A1 * | 11/2005 | Chu et al. ...................... 717/170 |
| 2007/0011288 A1 | 1/2007 | Cases et al. ................... 709/223 |
| 2007/0016814 A1 | 1/2007 | Rusu et al. .................... 713/320 |
| 2007/0168058 A1 * | 7/2007 | Kephart et al. ................ 700/82 |
| 2008/0036403 A1 * | 2/2008 | Ma et al. ......................... 318/49 |
| 2008/0281475 A1 | 11/2008 | Hirai et al. .................... 700/300 |
| 2009/0204270 A1 * | 8/2009 | Garcia .......................... 700/300 |
| 2012/0010754 A1 | 1/2012 | Matteson ...................... 700/300 |
| 2012/0203393 A1 * | 8/2012 | Dumitru et al. .............. 700/300 |
| 2013/0138788 A1 * | 5/2013 | Wang ............................ 709/223 |

OTHER PUBLICATIONS

Broyles et al., "IBM EnergyScale for POWER7 Processor-Based Systems," International Business Machines Corporation, Apr. 2011, pp. 1-66.

(Continued)

*Primary Examiner* — Darrin Dunn
*Assistant Examiner* — Christopher E Everett
(74) *Attorney, Agent, or Firm* — Van Leeuwen & Van Leeuwen; Steven L. Bennett (57) ABSTRACT

An approach is provided in which a master thermal controller utilizes a primary fan manager to control fans included in a computer system to cool various devices. When the master thermal controller determines that the primary fan manager is unresponsive, the master thermal controller transfers master thermal control to a backup thermal controller. The backup thermal controller creates fan control information based upon sensor information corresponding to the various devices, and sends the fan control information to a backup fan manager. In turn, the backup fan manager adjusts the speed of the fans according to the fan control information.

17 Claims, 7 Drawing Sheets

(56) References Cited

OTHER PUBLICATIONS

"Method and System for Defining a Desired Maximum Volume Level for an Audio Reception Comprising Multiple Audio Sources," ip.com, IPCOM000211511D, Oct. 7, 2011, 2 pages.

Brey, "Optimization of System Acoustic Signature and Cooling Capacity with Intelligent User Controls," U.S. Appl. No. 13/274,835, filed Oct. 17, 2011, 25 pages.

Brey, "Proactive Cooling Control Using Power Consumption Trend Analysis," U.S. Appl. No. 13/234,563, filed Sep. 16, 2011, 31 pages.

* cited by examiner

DISTRIBUTED THERMAL MANAGEMENT SYSTEM FOR SERVERS

BACKGROUND

The present disclosure relates to a distributed thermal management system that includes thermal controller and fan manager redundancy.

Computer systems may include a power and thermal management system that manages component power utilization. Dynamic Voltage and Frequency Scaling (DVFS), for example, is a common technique for managing power and saving energy. Computer systems may also include a micro controller as part of the power and thermal management system that controls fan operation within the computer systems based upon component temperature changes. For example, when a component's temperature exceeds a pre-defined thermal limit, the micro controller may instruct a fan manager to increase the speed of a fan in order to cool the device. When communication between the micro controller and the fan manager fail, the fan manager may resort to increasing the speed of each fan in order to avoid thermal failures.

BRIEF SUMMARY

According to one embodiment of the present disclosure, an approach is provided in which a master thermal controller utilizes a primary fan manager to control fans included in a computer system to cool various devices. When the master thermal controller determines that the primary fan manager is unresponsive, the master thermal controller transfers master thermal control to a backup thermal controller. The backup thermal controller creates fan control information based upon sensor information corresponding to the various devices, and sends the fan control information to a backup fan manager. In turn, the backup fan manager adjusts the speed of the fans according to the fan control information.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
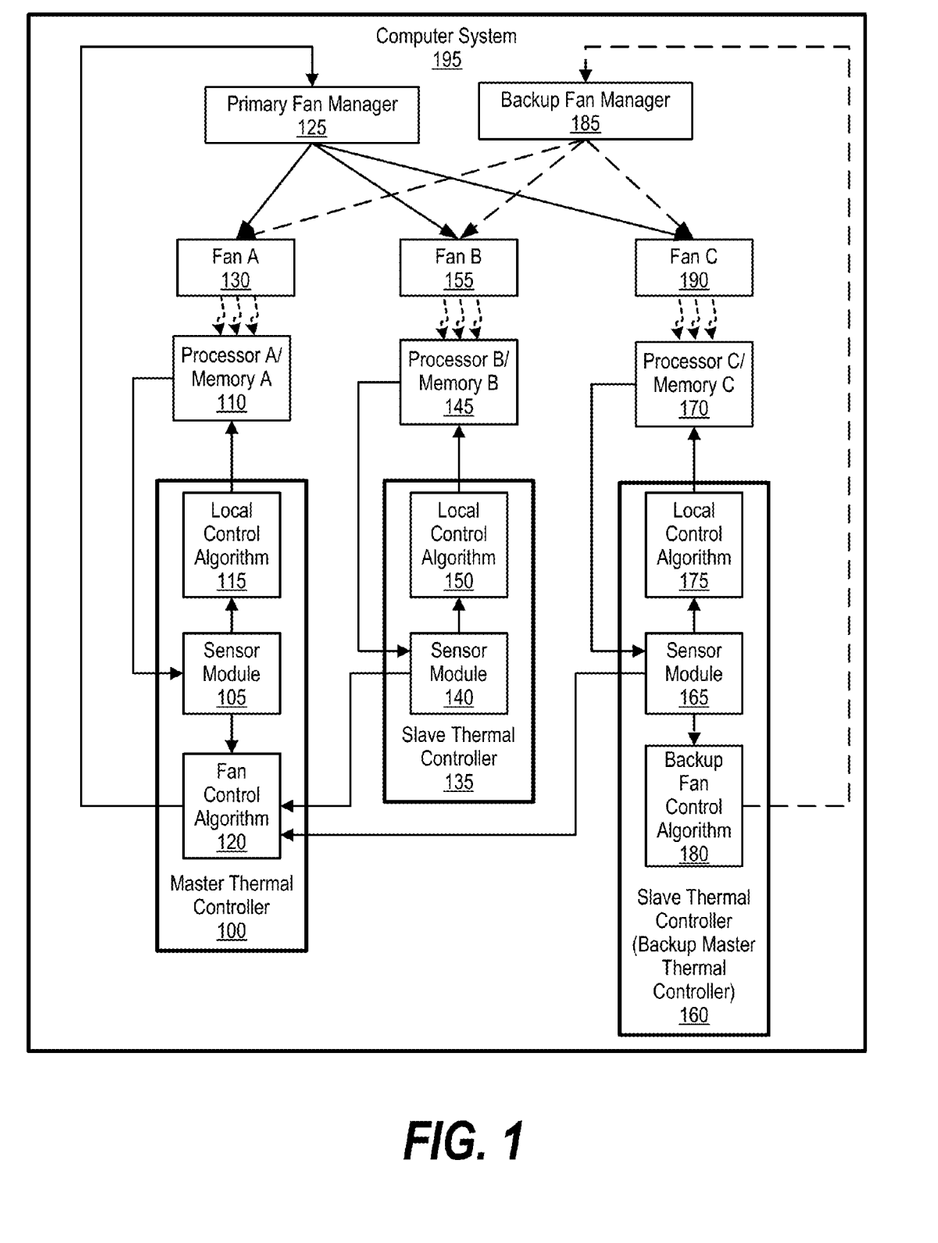
FIG. 1 is a diagram showing a master thermal controller communicating with a primary fan manager to operate fans within a computer system.

FIG. 1 is a diagram showing a master thermal controller communicating with a primary fan manager to operate fans within a computer system. Computer system 195 utilizes master thermal controller 100, primary fan manager 125, slave thermal controller 160, and backup fan manager 185 to provide thermal control redundancy and prevent a single point of failure.

Master thermal controller 100 includes sensor module 105, which receives local sensor information from processor A/memory A 110. For example, the local sensor information may include processor peak core temperatures, hottest DIMM (dual in-line memory module) temperatures, and/or hottest memory controller temperatures. Sensor module 105 sends the local sensor information to local control algorithm 115 that, in one embodiment, executes local protection algorithms to generate local thermal control information.

In turn, master thermal controller 100 sends the local thermal control information to processor A/memory A 110, which instructs processor A/memory A 110 to scale back using Dynamic Voltage and Frequency Scaling (DVFS) and/or memory throttling as required when the local sensor information indicates that processor A/memory A 110 has exceeded a thermal threshold.

Sensor module 105 also aggregates the local sensor information and sends the aggregated sensor information to fan control algorithm 120, which creates fan control information that it passes to primary fan manager 125 to control fan A 130 to cool processor A/memory A 110.

Similarly, slave thermal controller 135 includes sensor module 140, which receives local sensor information from processor B/memory B 145 and sends the local sensor information to local control algorithm 150. Local control algorithm 150 generates local thermal control information and sends the local thermal control information to processor B/memory B 145, which instructs processor B/memory B 145 to scale back on voltage or frequency as needed. As such, slave thermal controller 135 operates independently from other thermal controllers to manage local thermal control of processor B/memory B 145. Therefore, if slave thermal controller 135 loses communication with master thermal controller 100, slave thermal controller 135 is still able to control processor B/memory B 145's heat dissipation.

Sensor module 140 also aggregates its local sensor information and sends the aggregated sensor information to fan control algorithm 120, which creates fan control information that it passes to primary fan manager 125 to independently control fan B 155 to cool processor B/memory B 145.

Likewise, slave thermal controller 160, also designated as a backup thermal controller, includes sensor module 165. Sensor module 165 receives local sensor information from processor C/memory C 170 and sends the local sensor information to local control algorithm 175. Local control algorithm 175 generates local thermal control information and sends the local thermal control information to processor C/memory C 170, which instructs processor C/memory C 145 to scale back on voltage or frequency as needed. As such, slave thermal controller 160 operates independently from other thermal controllers to manage local thermal control of processor C/memory C 170.

Sensor module 165 also aggregates its local sensor information and sends the aggregated sensor information to fan control algorithm 120, which creates fan control information that it passes to primary fan manager 125 to control fan C 190 to cool processor C/memory C 170.

When master thermal controller 100 detects a communication failure with primary fan manager 125, master thermal controller 100 transfers master thermal control to slave thermal controller 160. In turn, slave thermal controller 160, now the backup master thermal controller, communicates with backup fan manager 185 to individually control fans 130, 155, and 190 accordingly (see FIG. 2 and corresponding text for further details).

Figure 2:
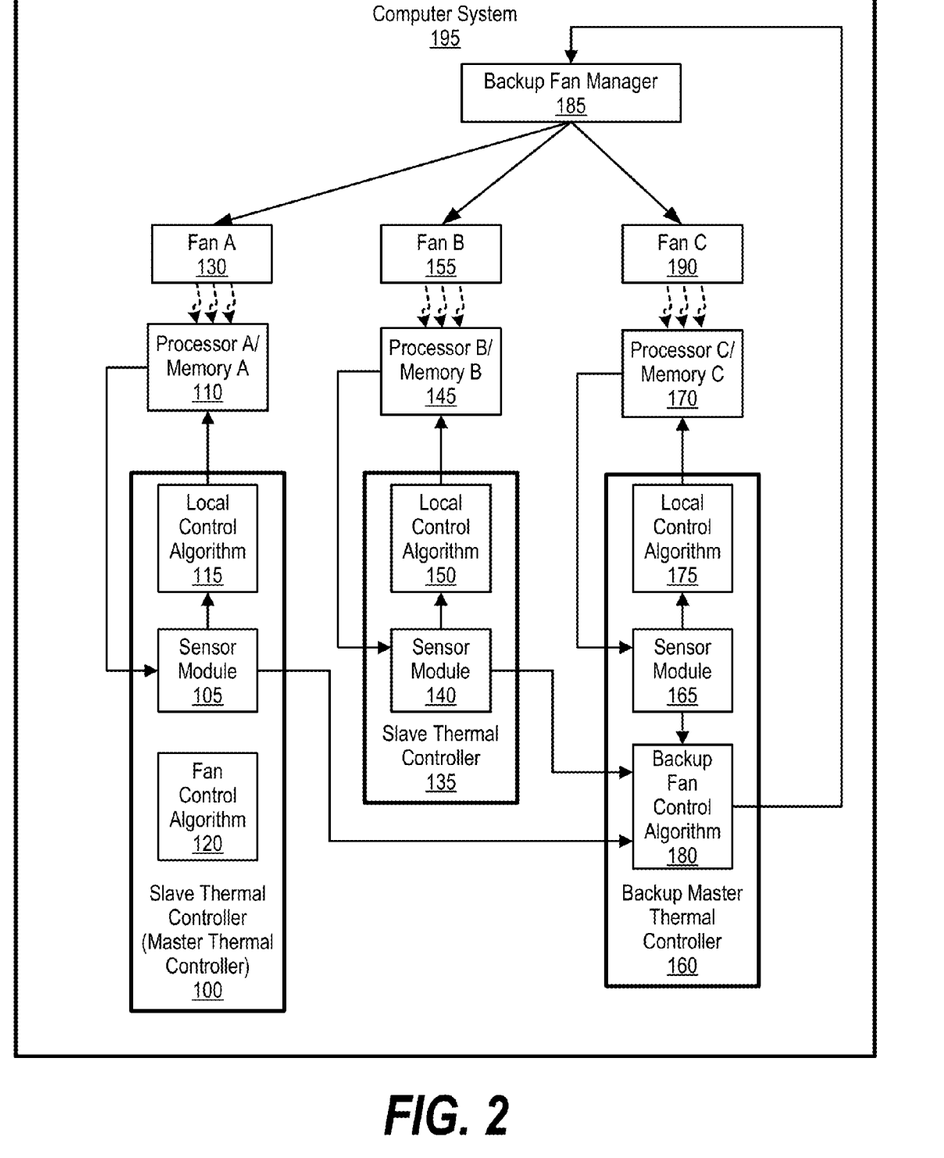
FIG. 2 is a is a diagram showing a backup thermal controller communicating with a backup fan manager to operate fans within a computer system.

FIG. 2 is a diagram showing a backup thermal controller communicating with a backup fan manager to individually control fans included in a computer system. FIG. 2 is similar to FIG. 1 with the exception that slave thermal controller 160 is assigned master thermal control. As such, slave thermal controller 160 utilizes aggregated sensor information received from master thermal controller 100 and slave thermal controller 135, as well as its local sensor information, to control fans 130, 155, and 190 through backup fan manager 185.

When master thermal controller 100 transfers master thermal control to slave thermal controller 160, master thermal controller 100 changes its status to a slave thermal controller and sends its aggregated sensor information to backup thermal controller 160 to process. In addition, slave thermal controller 135 receives a message that indicates the master thermal control transfer to backup master thermal controller 160. In turn, slave thermal controller 135 redirects its aggregated sensor information to backup master thermal controller 160. Backup fan control algorithm 180 creates fan control information from the received aggregated sensor information (including information from its own sensor module 165), and sends the fan control information to backup fan manager. In turn, backup fan manager 185 individually controls fans 130, 155, and 190 accordingly (see FIG. 3 and corresponding text for further details).

Figure 3:
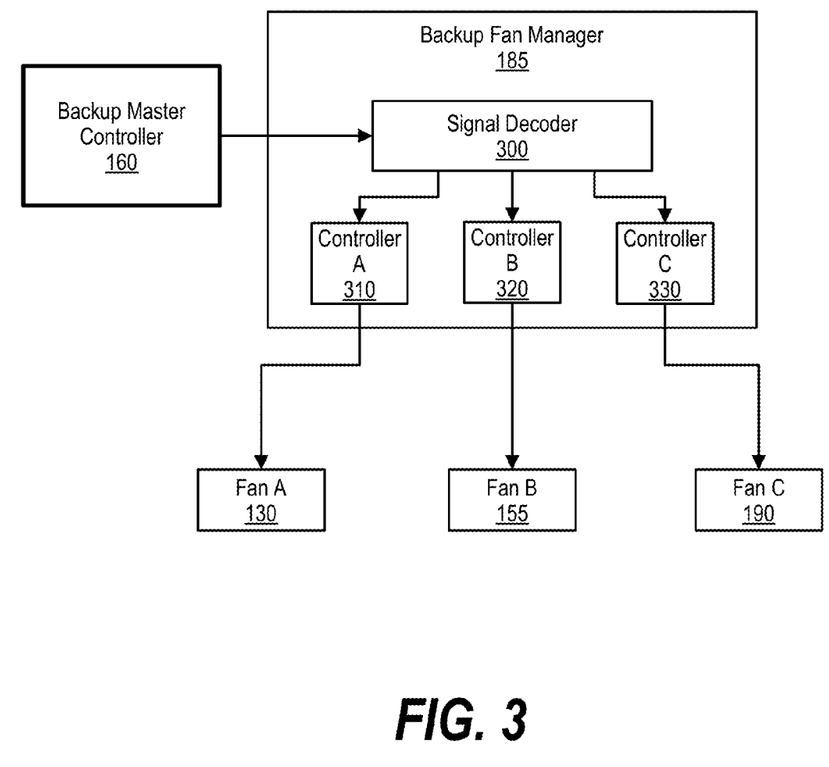
FIG. 3 is a diagram showing a backup fan manager receiving fan control information corresponding to multiple fans and individually controlling each of the fans according to the fan control information.

FIG. 3 is a diagram showing a backup fan manager receiving fan control information corresponding to multiple fans and individually controlling each of the fans according to the fan control information. Backup fan manager 185 receives fan control information from backup master thermal controller 160. In one embodiment, backup fan manager 185 includes signal decoder 300, which parses fan control information for different fans and passes the parsed information to controllers 310, 320, and 330. As such, backup fan manager 185 individually controls fans 130, 155, and 190 according to their corresponding processor/memory's specific thermal requirements.

Figure 4:
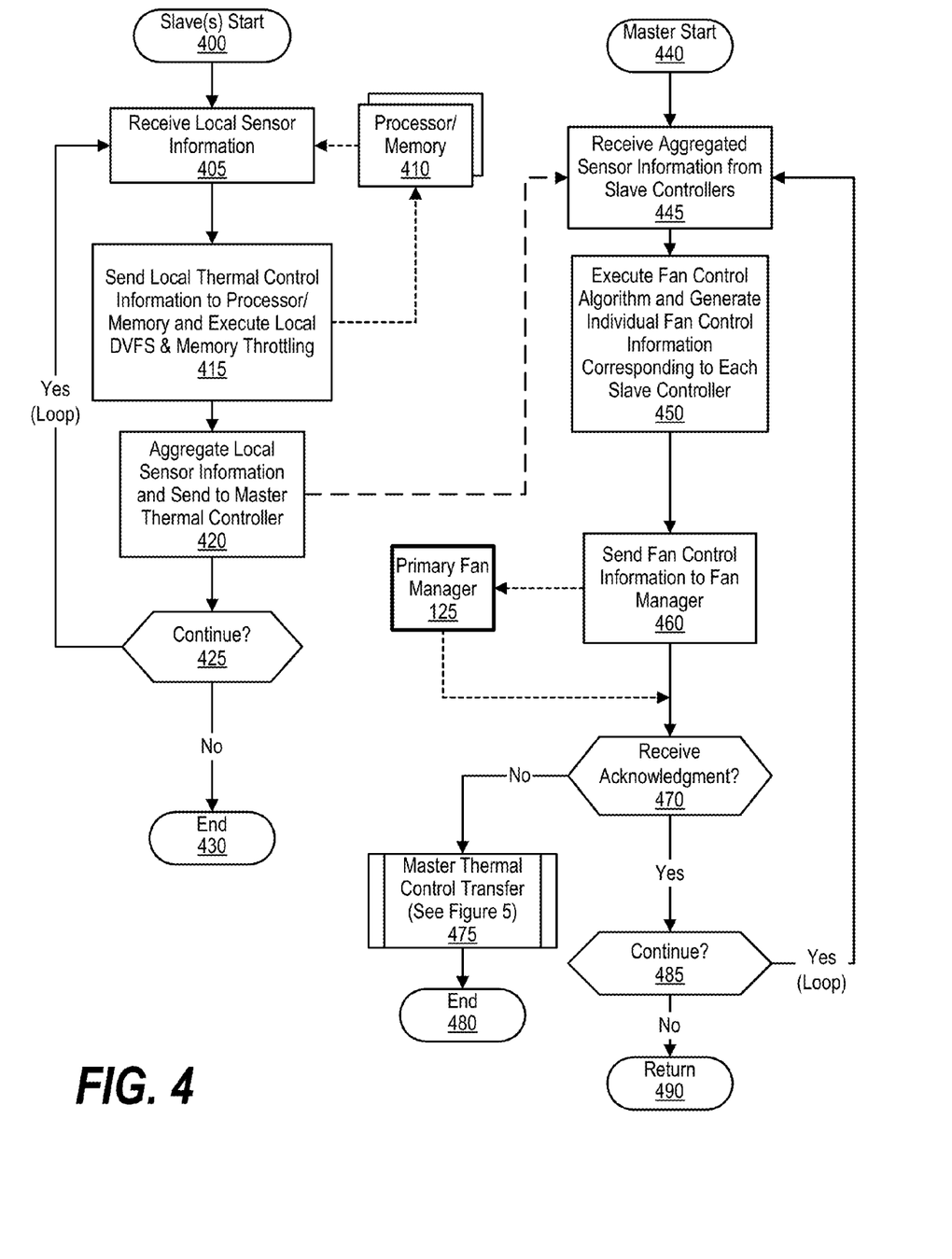
FIG. 4 is a flowchart showing steps taken in a master thermal controller detecting a lack of responsiveness from a primary fan controller.

FIG. 4 is a flowchart showing steps taken in a master thermal controller detecting a lack of responsiveness from a primary fan manager. Slave thermal controller processing commences at 400, whereupon the slave thermal controllers receive local sensor information from their corresponding processor/memories 410 (step 405). For example, the slave thermal controllers may receive processor peak core temperatures, hottest DIMM temperatures, and/or hottest memory controller temperatures.

At step 415, in one embodiment, each of the slave thermal controllers execute local protection algorithms to generate local thermal control information. The slave thermal controllers send the local thermal control information to their corresponding processor/memory 410, which instructs their corresponding processor/memory 410 to scale back using Dynamic Voltage and Frequency Scaling (DVFS) and/or memory throttling when the local sensor information indicates excessive thermal levels.

Each of the slave thermal controllers, at step 420, aggregate their own local sensor information and send the aggregated local sensor information to the master thermal controller, which controls fan operations to cool each of the slave thermal controller's corresponding processor/memory 410 (discussed below).

Master thermal controller processing commences at 440, whereupon the master thermal controller receives the aggregated local sensor information from the slave controllers at step 445. In one embodiment, the master thermal controller proceeds through steps similar to steps 405 and 415 discussed above to receive and process local sensor information from the master thermal controller's corresponding processor/memory (e.g., processor A/memory A 110 shown in FIG. 1).

At step 450, the master thermal controller executes fan control algorithms using the received aggregated local sensor information and generates fan control information for each individual fan that corresponds to each individual slave thermal controller. The master thermal controller sends the fan control information to primary fan manager 125 at step 460 to adjust the fans accordingly.

A determination is made as to whether primary fan manager 125 acknowledged receipt of the fan control information (decision 470). If primary fan manager 125 did not respond, indicating a point of communication failure, decision 470 branches to the "No" branch, whereupon the master thermal controller transfers master thermal control to one of the slave controllers (predefined process block 475, see FIG. 5 and corresponding text for further details), and processing ends at 480.

On the other hand, if primary fan manager 125 provided a response, decision 470 branches to the "Yes" branch, whereupon a determination is made as to whether the master thermal controller should continue to manage thermal control of the computer system (decision 485). If so, decision 485 branches to the "Yes" branch, which loops back to receive and process local sensor information and aggregated sensor information. This looping continues until the master thermal controller should terminate, at which point decision 485 branches to the "No" branch, whereupon master thermal controller processing ends at 490.

Likewise, a determination is made as to whether the slave thermal controllers should continue to manage thermal control of processors/memory 410 (decision 425). If so, decision 425 branches to the "Yes" branch, which loops back to receive and process local sensor information. This looping continues until the slave thermal controllers should terminate, at which point decision 425 branches to the "No" branch, whereupon slave thermal controller processing ends at 430.

Figure 5:
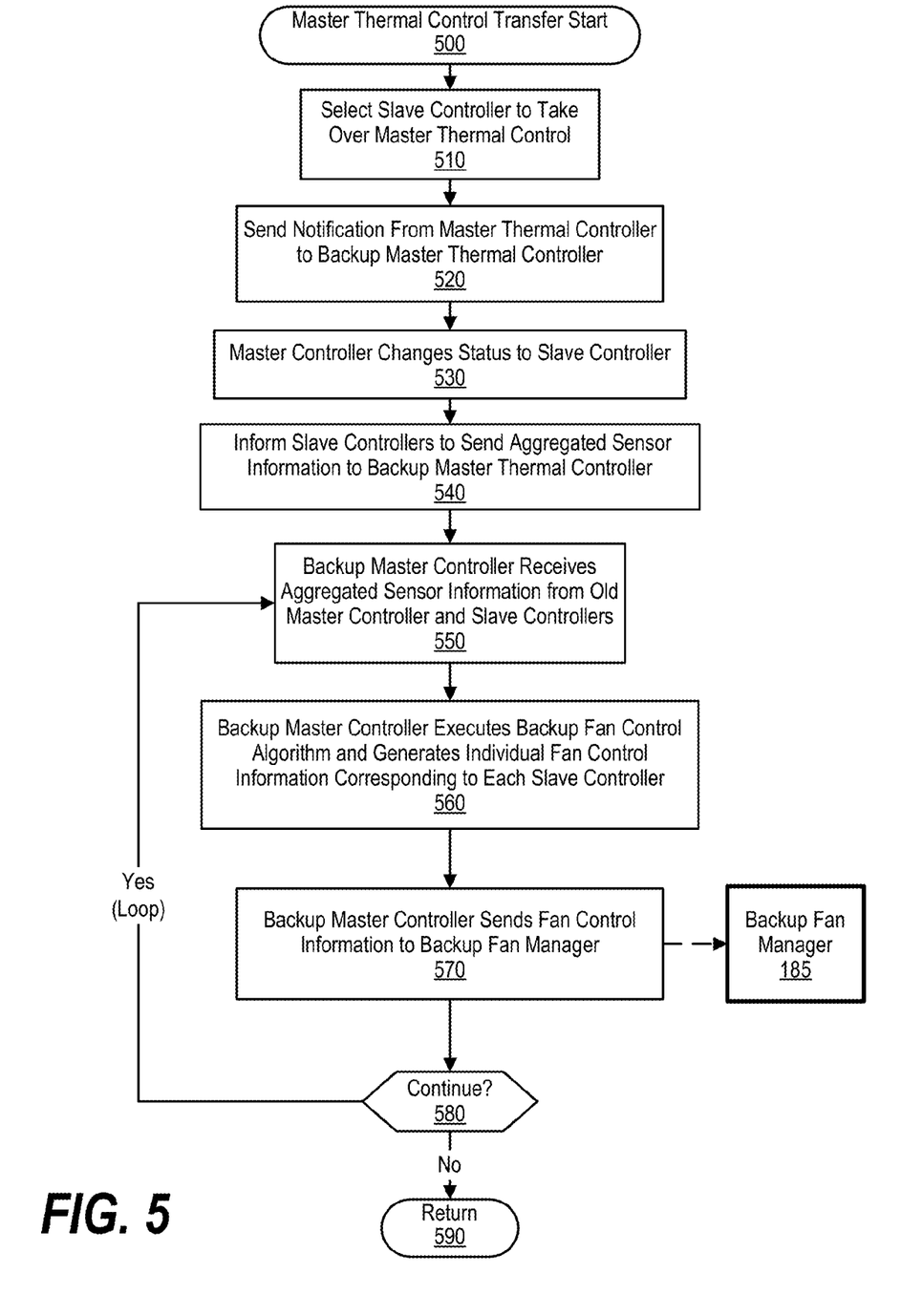
FIG. 5 is a flowchart showing steps taken in a master thermal controller transferring master thermal control over to a backup master thermal controller.

FIG. 5 is a flowchart showing steps taken in a master thermal controller transferring master thermal control over to a backup master thermal controller. Processing commences at 500, whereupon the master thermal controller selects a slave thermal controller, from a number of slave thermal controllers in the computer systems, to take possession of master thermal control (step 510). In one embodiment, the master thermal controller is programmed with a slave thermal controller identifier (e.g. controller 4) to assume master thermal control. In another embodiment, the master thermal controller analyzes workloads of the various slave thermal controllers and selects a particular slave thermal controller to take possession of master thermal control based on its workload.

At step 520, the master thermal controller sends a notification to the selected slave thermal controller, instructing the slave thermal controller to prepare for being the backup master thermal controller. Next, the master thermal controller changes its status to a slave thermal controller (step 530), and the backup master thermal controller sends notifications to the other slave thermal controllers to commence sending their aggregated sensor information to the backup master thermal controller (step 540).

At step 550, the backup master thermal controller receives aggregated sensor data from the slave thermal controllers (includes the old master thermal controller). The backup master thermal controller executes backup fan control algorithms and generates individual fan control information corresponding to each slave thermal controller at step 560 (similar to step 450 shown in FIG. 4). In turn, at step 570, the backup master thermal controller sends the fan control information to backup fan manager 185 in order for backup fan manager 185 to adjust fan speeds accordingly.

In one embodiment, the backup master thermal controller determines whether backup fan manager 185 provides a response and, if not, the backup fan manager may initiate a message that the computer system may not have adequate thermal control.

A determination is made as to whether the backup master thermal controller should continue managing computer system thermal control (decision 580). If so, decision 580 branches to the "Yes" branch, which receives and processes aggregated sensor information received from slave controllers. On the other hand, if the backup master thermal controller should terminate, decision 580 branches to the "No" branch, whereupon processing returns at 590.

Figure 6:
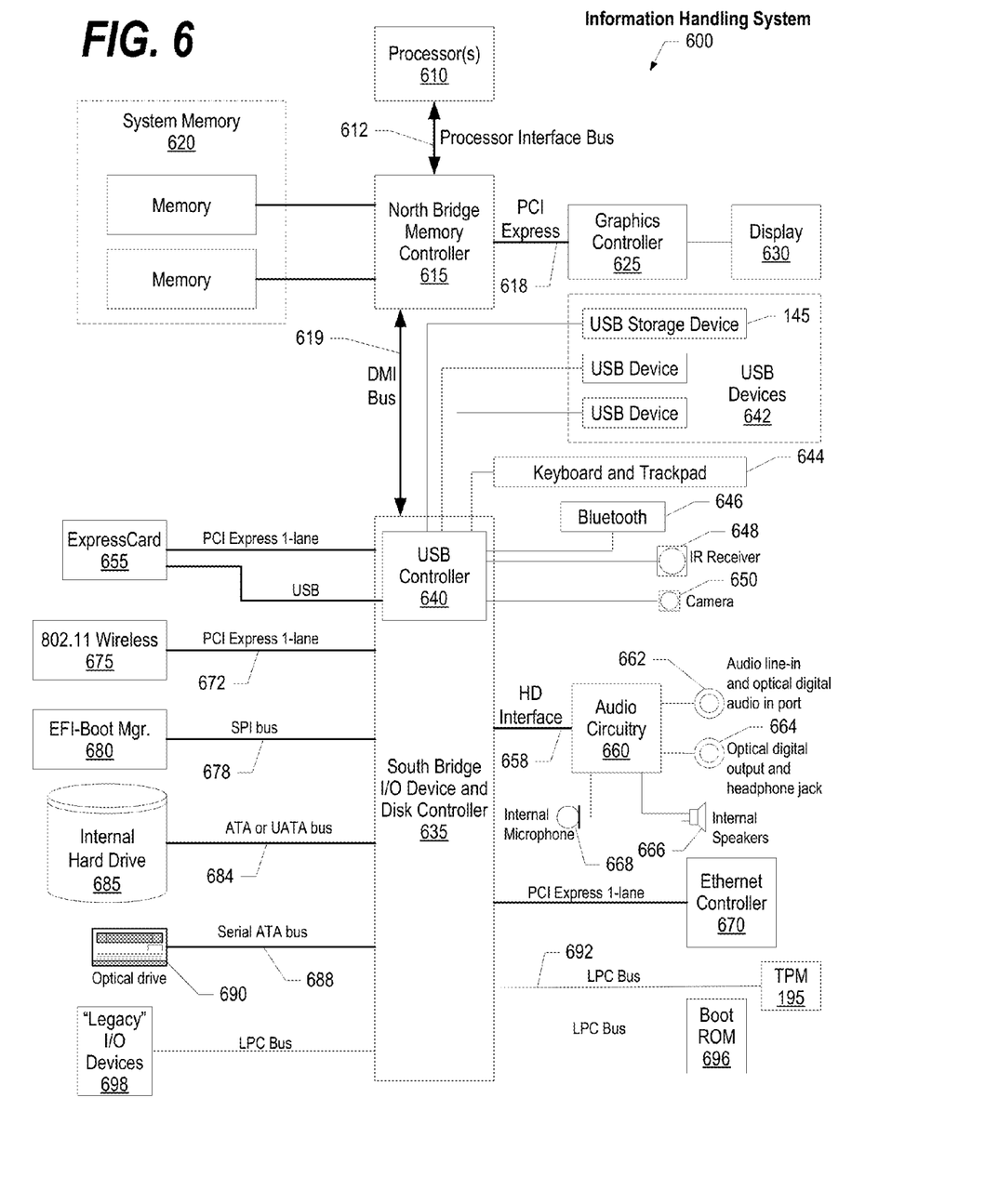
FIG. 6 is a block diagram of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etceteras.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wireless communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
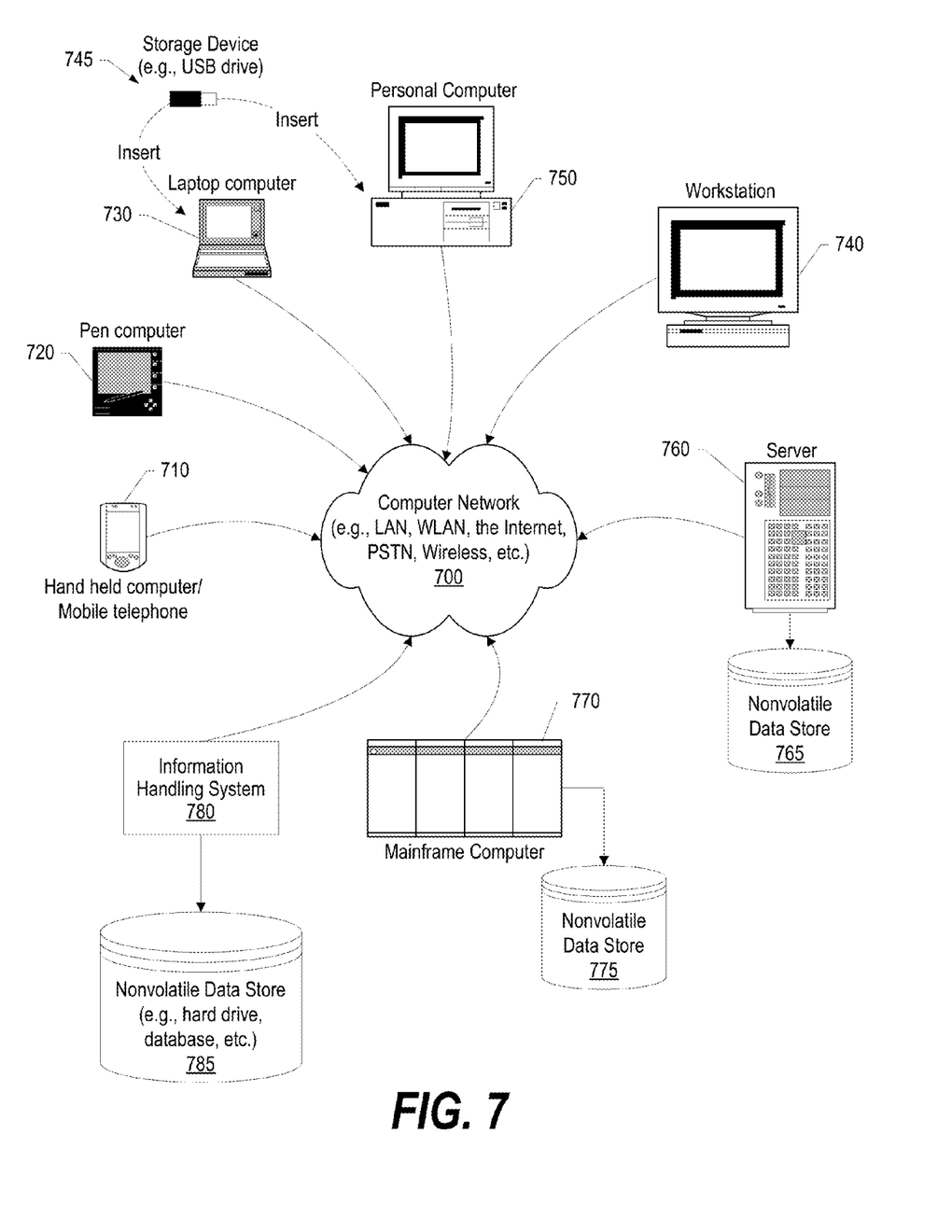
FIG. 7 provides an extension of the information handling system environment shown in FIG. 6 to illustrate that the methods described herein can be performed on a wide variety of information handling systems which operate in a networked environment.

FIG. 7 provides an extension of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 645 can be shared among two or more information handling systems using various techniques, such as connecting the removable nonvolatile storage device 645 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    sending, from a first thermal controller, fan control information to a first fan manager to control a plurality of fans, wherein the fan control information is based upon first sensor information and second sensor information, the first sensor information corresponding to one or more first devices supported by the first thermal controller, and the second sensor information corresponding to one or more second devices supported by the second thermal controller;
    transferring thermal control from the first thermal controller to the second thermal controller in response to determining that the first fan manager is unresponsive to a request from the first thermal controller;
    in response to transferring thermal control to the second thermal controller:
        receiving, at the second thermal controller, subsequent first sensor information from the first thermal controller;
        creating subsequent fan control information at the second thermal controller that includes the subsequent first sensor information and subsequent second sensor information, wherein the subsequent first sensor information corresponds to the one or more first devices and the subsequent second sensor information corresponds to the one or more second devices; and
        sending the subsequent fan control information from the second thermal controller to a second fan manager, wherein the second fan manager controls the plurality of fans based upon the subsequent fan control information.

2. The method of claim 1 further comprising:
    adjusting, by the second fan manager, a fan speed of a first fan corresponding to at least one of the one or more first devices according to the subsequent fan control information.

3. The method of claim 1 wherein, prior to transferring the thermal control, the method further comprising:
    receiving, at the second thermal controller, local sensor information from at least one of the one or more second devices;
    generating, by the second thermal controller, local thermal control information based upon the local sensor information;
    sending the local thermal control information to the local device;
    generating, by the second thermal controller, the second sensor information based upon the local sensor information; and
    sending, by the second thermal controller, the second sensor information to the first thermal controller.

4. The method of claim 1 wherein the determining further comprises:
    receiving a plurality of different sensor information at the first thermal controller;
    creating different fan control information at the first thermal controller based upon the plurality of different sensor information;
    sending the different fan control information from the first thermal controller to the first fan manager; and
    failing to receive a response from the first fan manager in response to sending the different fan control information.

5. The method of claim 1 further comprising:
    selecting, by the first thermal controller, the second thermal controller from a plurality of slave thermal controllers for which to transfer the thermal control.

6. The method of claim 1 wherein the second fan manager controls each of the plurality of fans according to thermal requirements of each of their respective one of a plurality of devices that includes the one or more first devices and the one or more second devices.

7. The method of claim 1 wherein the first fan manager controlled the plurality of fans prior to the transferring of the thermal control from the first thermal controller to the second thermal controller.

8. An information handling system comprising:
one or more processors;
a memory coupled to at least one of the processors;
a set of computer program instructions stored in the memory and executed by at least one of the processors in order to perform actions of:
   sending, from a first thermal controller, fan control information to a first fan manager to control a plurality of fans, wherein the fan control information is based upon first sensor information and second sensor information, the first sensor information corresponding to one or more first devices supported by the first thermal controller, and the second sensor information corresponding to one or more second devices supported by the second thermal controller;
   transferring thermal control from the first thermal controller to the second thermal controller in response to determining that the first fan manager is unresponsive to a request from the first thermal controller;
   in response to transferring thermal control to the second thermal controller:
      receiving, at the second thermal controller, subsequent first sensor information from the first thermal controller;
      creating subsequent fan control information at the second thermal controller that includes the subsequent first sensor information and subsequent second sensor information, wherein the subsequent first sensor information corresponds to the one or more first devices and the subsequent second sensor information corresponds to the one or more second devices; and
      sending the subsequent fan control information from the second thermal controller to a second fan manager, wherein the second fan manager controls the plurality of fans based upon the subsequent fan control information.

9. The information handling system of claim 8 wherein the set of computer program instructions, when executed by at least one of the processors, cause at least one of the processors to perform additional actions comprising:
   adjusting, by the second fan manager, a fan speed of a first fan corresponding to at least one of the one or more first devices according to the subsequent fan control information.

10. The information handling system of claim 8 wherein the set of computer program instructions, when executed by at least one of the processors, cause at least one of the processors to perform additional actions comprising:
   receiving, at the second thermal controller, local sensor information from at least one of the one or more second devices;
   generating, by the second thermal controller, local thermal control information based upon the local sensor information;
   sending the local thermal control information to the local device;
   generating, by the second thermal controller, the second sensor information based upon the local sensor information; and
   sending, by the second thermal controller, the second sensor information to the first thermal controller.

11. The information handling system of claim 8 wherein the set of computer program instructions, when executed by at least one of the processors, cause at least one of the processors to perform additional actions comprising:
   receiving a plurality of different sensor information at the first thermal controller;
   creating different fan control information at the first thermal controller based upon the plurality of different sensor information;
   sending the different fan control information from the first thermal controller to the first fan manager; and
   failing to receive a response from the first fan manager in response to sending the different fan control information.

12. The information handling system of claim 8 wherein the set of computer program instructions, when executed by at least one of the processors, cause at least one of the processors to perform additional actions comprising:
   selecting, by the first thermal controller, the second thermal controller from a plurality of slave thermal controllers for which to transfer the thermal control.

13. The information handling system of claim 8 wherein the second fan manager controls each of the plurality of fans according to thermal requirements of each of their respective one of a plurality of devices that includes the one or more first devices and the one or more second devices.

14. A computer program product stored in a non-transitory computer readable storage medium, comprising computer program code that, when executed by an information handling system, causes the information handling system to perform actions comprising:
   sending, from a first thermal controller, fan control information to a first fan manager to control a plurality of fans, wherein the fan control information is based upon first sensor information and second sensor information, the first sensor information corresponding to one or more first devices supported by the first thermal controller, and the second sensor information corresponding to one or more second devices supported by the second thermal controller;
   transferring thermal control from the first thermal controller to the second thermal controller in response to determining that the first fan manager is unresponsive to a request from the first thermal controller;
   in response to transferring thermal control to the second thermal controller:
      receiving, at the second thermal controller, subsequent first sensor information from the first thermal controller;
      creating subsequent fan control information at the second thermal controller that includes the subsequent first sensor information and subsequent second sensor information, wherein the subsequent first sensor information corresponds to the one or more first devices and the subsequent second sensor information corresponds to the one or more second devices; and
      sending the subsequent fan control information from the second thermal controller to a second fan manager, wherein the second fan manager controls the plurality of fans based upon the subsequent fan control information.

15. The computer program product of claim 14 wherein the information handling system performs further actions comprising:
   adjusting, by the second fan manager, a fan speed of a first fan corresponding to at least one of the one or more first devices according to the subsequent fan control information.

16. The computer program product of claim 14 wherein the information handling system performs further actions comprising:
- receiving, at the second thermal controller, local sensor information from at least one of the one or more second devices;
- generating, by the second thermal controller, local thermal control information based upon the local sensor information;
- sending the local thermal control information to the local device;
- generating, by the second thermal controller, the second sensor information based upon the local sensor information; and
- sending, by the second thermal controller, the second sensor information to the first thermal controller.

17. The computer program product of claim 14 wherein the information handling system performs further actions comprising:
- receiving a plurality of different sensor information at the first thermal controller;
- creating different fan control information at the first thermal controller based upon the plurality of different sensor information;
- sending the different fan control information from the first thermal controller to the first fan manager; and
- failing to receive a response from the first fan manager in response to sending the different fan control information.

* * * * *